US010170211B2

(12) United States Patent
Sur et al.

(10) Patent No.: US 10,170,211 B2
(45) Date of Patent: Jan. 1, 2019

(54) SYSTEM AND METHOD FOR COLLECTING $^3$HE GAS FROM HEAVY WATER NUCLEAR REACTORS

(71) Applicant: Atomic Energy Of Canada Limited / Énergie Atomique Du Canada Limitée, Chalk River (CA)

(72) Inventors: Bhaskar Sur, Deep River (CA); Lakshman Rodrigo, Deep River (CA); Richard Didsbury, Deep River (CA)

(73) Assignee: Atomic Energy of Canada Limited / Énergie Atomique Du Canada Limitée, Chalk River, Ontario (CA)

( * ) Notice: Subject to any disclaimer, the term of this patent is extended or adjusted under 35 U.S.C. 154(b) by 162 days.

(21) Appl. No.: 15/241,553

(22) Filed: Aug. 19, 2016

(65) Prior Publication Data

US 2016/0372226 A1 Dec. 22, 2016

Related U.S. Application Data

(62) Division of application No. 13/852,216, filed on Mar. 28, 2013, now Pat. No. 9,455,056.

(60) Provisional application No. 61/617,802, filed on Mar. 30, 2012.

(51) Int. Cl.
*G21C 23/00* (2006.01)
*G21G 1/02* (2006.01)
*G21G 1/00* (2006.01)

(52) U.S. Cl.
CPC ............... *G21G 1/02* (2013.01); *G21C 23/00* (2013.01); *G21G 1/001* (2013.01)

(58) Field of Classification Search
CPC ............ G21G 1/02; G21G 1/001; G21C 23/00
USPC ......................................... 376/189, 313, 314
See application file for complete search history.

(56) References Cited

PUBLICATIONS

Thomas, "Enhanced Tritium Production for Fusion Reactors Via 3He(n, p) 3H in the Heavy Water Moderator of a CANDU Reactor", Journal of Fusion Energy, vol. 4, No. 1, 1985. (Year: 1985).*
Suppiah, "As assessment of the use of AECL's wetproofed recombiner catalyst for the moderator cover gas system in CANDUs", 2006. (Year: 2006).*
Atlantic Nuclear Services Ltd, "Cost-Effectiveness of Reduction of Off-Site Dose", Atomic Energy Control Board, Canada, INFO-0277, Mar. 1988. (Year: 1988).*

(Continued)

*Primary Examiner* — Jack W Keith
*Assistant Examiner* — Dan Wasil
(74) *Attorney, Agent, or Firm* — Kevin Shipley; Gilbert's LLP (57) ABSTRACT

A method of collecting $^3$He from a nuclear reactor may include the steps of a) providing heavy water at least part of which is exposed to a neutron flux of the reactor, b) providing a cover gas in fluid communication with the heavy water, c) operating the nuclear reactor whereby thermal neutron activation of deuterium in the heavy water produces tritium ($^3$H) and at least some of the tritium produces $^3$He gas by $\beta^-$ decay and at least a portion of the 3He gas escapes from the heavy water and mixes with the cover gas, d) extracting an outlet gas stream, the outlet gas stream comprising a mixture of the cover gas and the 3He gas and e) separating the 3He gas from the outlet gas stream.

9 Claims, 6 Drawing Sheets

(56) References Cited

PUBLICATIONS

Boss, "Radioactive Effluents from CANDU 6 Reactors During Normal Operation", AECL-11506, Dec. 1995. (Year: 1995).*
Shea et al., The Helium-3 Shortage: Supply, Demand, and Options for Congress, Congressional Research Services, Dec. 22, 2010.
Bentz et. al., US Government Approach to Addressing the He-3 Shortage. Jul. 2011.
McElroy, AAAS News Release—AAAS Workshop Explores How to Meet Demand for Helium-3 in Medicine, Industry, and Security, Apr. 23, 2010.
He3 Fact Sheet, U.S. DOE Office of Science (SC), Mar. 18, 2011.
Adee, Physics Projects Deflate for Lack of Helium-3, IEEE Spectrum, IEEE Spectrum: Technology, Engineering, and Science News, May 2011.
Kouzes et al., Neutron detection alternatives to 3He for national security applications, Nuclear Instruments and Methods in Physics Research, 2010, pp. 1035-1045, vol. A623.3.
TGM Neutron Detectors, MIT—Massachusetts Institute of Technology, Jul. 15, 2011.
McMillan et al., Neutron Detectors for Security Applications, Proceedings of Science, Jul. 20, 2011, Vertex.
Bentoumi et al., Characterization of a Liquid Scintillator Based on Linear Alkyl Benzene for Neutron Detection, Nuclear Instruments and Methods in Physics Research A, 2013, pp. 221-224, vol. 701.
Song et al., Tritium Inventory Prediction in a Candu Plant, Waste Management, 1995, pp. 593-598, vol. 15, No. 8.
Thomas, Evolution of the Isotopic in Candu™ Moderator Systems and in the Thermal Neutron Activation of Helium-3, Ann. Nucl. Energy, 1992, pp. 409-412, vol. 19, No. 7.
CANDU Reactor Schematic. Svg, Wikipedia, Mar. 14, 2012.
Diego, Work Domain Analysis of a CANDU Reactor Moderator System, University of Toronto, 2007.
Abel, Thermal and Magnetic Properties of Liquid He3 at Low Pressure and at very Low Temperatures, Physics, 1965, pp. 337-387, vol. 1, No. 6.
McInteer et al., The Thermal Diffusion Constant of Helium and the Separation of He3 by Thermal Diffusion, Phys. Rev., 1947, pp. 510-511, vol. 72, No. 6.
McInteer et al., Concentration of He3 by Thermal Diffusion, Phys. Rev., 1948, pp. 946-949, vol. 74, No. 8.
Schuette et al., Apparatus for Concentration of He3 by Thermal Diffusion, the Review of Science Instruments, Dec. 1950, pp. 1016-1018, vol. 21, No. 12.
Bowring, Atomic Energy Research Establishment, England, Technical Report, AERE-GP/R-2058 (Pt. 1 &2), (1957) and (1958).
Enskog, A Generalization of Maxwell's Second Kinetic Gas Theory, Physik Zeits, 1911, pp. 56-60, vol. 12.
Chapman, A Note on Thermal Diffusion, Phil. Mag., 1917, pp. 248-253 vol. 33, No. 248.
Clusius et al., Neues Verfahren zur Gasentmischung und Isotopentrennung, Naturwiss, 1938, pp. 546, vol. 26.
Furry et al., On the Theory of Isotope Separation by Thermal Diffusion, Phys. Rev., 1939, pp. 1083-1095, vol. 55.
Furry et al., Isotope Separation by Thermal Diffusion: The Cylindrical Case, Phys. Rev., 1946, pp. 459-471, vol. 69, Nos. 9 and 10.
Jones et al., The Separation of Isotopes by Thermal Diffusion, Reviews of Modern Physics, pp. 151-224, vol. 18, No. 2.
Hodor, Correction to the Furry-Jones-Onsager Theory of the Thermal-Diffusion Column, Sep. Sci. Technol., 2003, pp. 1229-1246, vol. 38, No. 5.
Wilkes, A Continuous-Distillation Apparatus for the Separation of He3 from He4, Advances in Cryogenic Engineering, 1970, pp. 298-301, vol. 16.
Grigor'Ev et al., Investigation of the Rectification of a Helium Isotope Mixture in Packless Columns, Sov. Phys., J. E.T.P., 1967, pp. 572-574, vol. 25, No. 4.
Sherman, The Separation of 3He from 3He-4He Mixtures, Proceedings of the 10th International Conference on Low-Temperature Physics, 1966, pp. 188-196, vol. 1.
Giffard et al., Rectifying column for purifying helium-3, Cryogenics, 1967, pp. 179-180, vol. 7.
Anderson, Purification of helium-3, 1968, Cryogenics, pp. 50, vol. 8.
Tominaga et al., Rapid Purification of 3He, J. Phys., D: Appl. Phys., 1989, pp. 1020-1024, vol. 22.
Lane et al., He3 Separation by a Heat Flux in Liquid Helium II, Phys. Rev., 1948, pp. 256-257, vol. 73.
Soller et al., The Rapid Separation of He3 from He4 by the "Heat Flush" Method, Phys. Rev., 1953, pp. 1058-1060, vol. 91, No. 5.
Peshkov, Experiments in Enrichment of Helium with Isotope He3, Soviet Physics JETP, 1956, pp. 706-710, vol. 3, No. 5.
Reynolds et al., "Heat Flush" Method of He3 Separation, Phys. Rev., 1949, pp. 64-66, vol. 76, No. 1.
Daunt et al., The Separation of the Isotopes He3 and He4 in the Liquid Phase, J. Chem. Phys., 1947, pp. 759-760, vol. 15, No. 19.
Atkins et al., A Method of Concentrating He3-He4 Mixtures, Can. J. Phys., 1954, pp. 702-707, vol. 32, No. 11.
Dmitriev et al., Separation of 3He from 3He-4He Mixture by Means of Adsorption, Journal of Low Temperature Physics, 2005, pp. 877-880, vol. 138, Nos. 3/4.
Rodrigo et al., Tritium Emissions from a Detritiation Facility, Fusion Science and Technology, 2011, pp. 1268-1271, vol. 60.
Rodin et al., Solid Solutions of Helium in Titanium Containing Up to 30 at.% of Helium, Russin. J. Phys. Chem., 1971, pp. 612-614, vol. 45, No. 5.
Heung, Titanium for Long-Term Tritium Storage (U), Westinghouse Savannah River Company, WSRC-TR-94-0596, 1994.

* cited by examiner

Tritium Activity in the Moderator as a Function of Time – Existing Reactor One

FIG. 5

Tritium Activity in the Moderator as a Function of Time – Existing Reactor Two

FIG. 6

Accumulated ³He and moderator tritium activity as a function of time for a CANDU 6 reactor

SYSTEM AND METHOD FOR COLLECTING $^3$HE GAS FROM HEAVY WATER NUCLEAR REACTORS

CROSS REFERENCE TO RELATED APPLICATIONS

This application is a divisional of U.S. patent application Ser. No. 13/852,216, filed Mar. 28, 2013, which claims the benefit of U.S. Provisional Patent Application No. 61/617,802, filed Mar. 30, 2012, and the entire contents of which are hereby incorporated by reference.

FIELD

The present subject matter of the teachings described herein relates generally to a method and system for collecting $^3$He gas from heavy water moderated and/or cooled nuclear reactors.

BACKGROUND $^3$He is an isotope of helium with applications in many different industries. $^3$He can be formed by beta decay of tritium.

One known source of $^3$He gas is the decay tritium in nuclear weapons. Another source of tritium is the irradiation of tritium producing burnable absorber rods (TPBARs) within light water nuclear reactors.

Another source of tritium is heavy water nuclear reactors. Heavy water includes deuterium. Heavy water reactors, for example reactors that use heavy water as a moderator, coolant or both, may produce tritium as a result of thermal neutron activation of the deuterium in the heavy water. The heavy water can be detritiated, the tritium can be collected and $^3$He may be obtained as the tritium decays.

Demand for $^3$He may exceed the supply of $^3$He from known production and/or collection methods. $^3$He may be commercially valuable. Therefore, there remains a need for an alternative apparatus and/or system for directly collecting $^3$He.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In accordance with one broad aspect of the teachings described herein, a method of collecting $^3$He from a nuclear reactor may include the steps of a) providing heavy water at least part of which is exposed to a neutron flux of the reactor, b) providing a cover gas in fluid communication with the heavy water, c) operating the nuclear reactor whereby thermal neutron activation of deuterium in the heavy water produces tritium ($^3$H) and at least some of the tritium produces $^3$He gas by $\beta^-$ decay and at least a portion of the 3He gas escapes from the heavy water and mixes with the cover gas, d) extracting an outlet gas stream, the outlet gas stream comprising a mixture of the cover gas and the 3He gas and e) separating the 3He gas from the outlet gas stream.

The method may also include outputting a $^3$He gas stream for further processing and may include treating the outlet gas stream to provide a treated cover gas stream.

The method may include mixing at least a portion of the treated cover gas stream into the cover gas in fluid communication with the heavy water.

The step of extracting the outlet gas stream may be performed while nuclear reactor is operating and the outlet gas stream may be extracted as a generally continuous stream while nuclear reactor is operating.

The step of separating the $^3$He gas from the outlet gas stream may be an on-line process that is performed while the nuclear reactor is operating.

The step of separating the $^3$He gas from the outlet gas stream may include at least one of a thermal diffusion process, a fractional diffusion process, a heat flush process, a superleak process and a differential absorption process.

The cover gas may contact the heavy water at a free surface interface.

A method of collecting $^3$He from a nuclear reactor may include the steps of a) providing heavy water at least part of which is exposed to a neutron flux of the reactor, b) operating the nuclear reactor whereby thermal neutron activation of deuterium in the heavy water produces tritium ($^3$H) and at least some of the tritium produces $^3$He gas by $\beta^-$ decay and at least a portion of the $^3$He gas escapes from the heavy water, c) extracting an outlet gas including the $^3$He gas, and d) optionally, separating the $^3$He gas from any other gas in the outlet gas stream.

According to another broad aspect of the teachings described herein, a system for collecting $^3$He may include a nuclear reactor having a vessel containing a heavy water and having a cover gas head space containing a cover gas above the heavy water. The reactor may have a gas outlet in communication with the cover gas head space. Operation of the nuclear reactor may result in thermal neutron activation of deuterium in the heavy water to produce tritium ($^3$H) and at least some of the tritium may undergo $\beta^-$ decay to produce $^3$He gas that mixes with the cover gas. A gas extraction passage may be fluidly connected to the gas outlet of the vessel to extract a gas outlet stream through the gas outlet. The gas outlet stream may include the cover gas and the $^3$He gas mixed with the cover gas. A $^3$He separation apparatus may be fluidly connected to the gas extraction passage downstream gas outlet and may be operable to receive the gas outlet stream and separate the $^3$He gas from the cover gas.

A gas inlet may be provided in the vessel and in communication with the cover gas head space. A cover gas supply passage may be coupled to the gas inlet of the vessel to supply the cover gas to the cover gas head space.

The $^3$He separation apparatus may include a $^3$He outlet to output a separated $^3$He gas stream and a separate treated cover gas outlet to output a treated cover gas stream.

The treated cover gas outlet of the $^3$He separation apparatus may be fluidly connected to the cover gas supply passage to re-introduce at least a portion of the treated cover gas stream into the cover gas head space.

The gas outlet stream may be extractable as a generally continuous gas stream while the nuclear reactor is in operation.

The cover gas provided above the heavy water may consist essentially of $^4$He.

The $^3$He separation apparatus may include at least one of a thermal diffusion apparatus, a fractional diffusion apparatus, a heat flush apparatus, a superleak apparatus and a differential absorption apparatus.

According to yet another broad aspect of the teachings described herein a moderator cover gas system for use with a nuclear reactor having a vessel containing heavy water may include a cover gas supply passage having a gas outlet connectable to a gas inlet on the vessel to supply a cover gas into the vessel. A gas extraction passage may have a gas inlet connectable to a gas outlet on the vessel to extract an outlet gas stream from within the vessel. The outlet gas stream may include a mixture of at least the cover gas and $^3$He gas. A gas separation apparatus may be connected to the cover gas flow passage downstream from the gas outlet on the vessel and operable to separate the $^3$He gas from the outlet gas stream.

A fresh cover gas source may be fluidly connected to the cover gas supply passage to introduce cover gas consisting essentially of $^4$He into the interior of the vessel.

The gas separation apparatus may include a first outlet to output the separated $^3$He gas and a second outlet to output a treated cover gas stream. The second outlet may be fluidly connected to the cover gas supply passage to feed at least a portion of the treated cover gas stream into the cover gas supply passage.

DRAWINGS

The drawings included herewith are for illustrating various examples of articles, methods, and apparatuses of the teaching of the present specification and are not intended to limit the scope of what is taught in any way.

In the drawings.

Elements shown in the figures have not necessarily been drawn to scale. Further, where considered appropriate, reference numerals may be repeated among the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Helium$^{-3}$ ($^3$He) is an isotope of helium, with $^4$He being the most common isotope of helium by a large factor. $^3$He has applications in a variety of industries including, for example, the nuclear safeguard, security, medical and oil and gas industries.

For example, $^3$He can be used in neutron detector apparatuses that can be used to detect nuclear and radiological materials. Such neutron detector apparatuses may be used at border crossings, ports, airports and other points of entry into a country in an attempt to help detect smuggled and/or concealed nuclear material.

In other examples, $^3$He may be used in combination with magnetic resonance imaging (MRI) to help provide visualization of a patient's lung capacity and function and/or may be used to help determine the rock porosity and/or presence of hydrocarbon reserves in the oil and gas industry. In the construction industry, neutron detectors utilizing $^3$He may be used to measure soil compaction and moisture content. $^3$He may also be used to obtain low refrigeration temperatures via dilution refrigeration.

$^3$He gas can be produced by the decay of the radioactive isotope tritium ($^3$H), which has a half life of 12.3 years.

One source of $^3$He is tritium found in thermonuclear warheads. As the tritium decays it produces $^3$He. Tritium has also been produced through neutron irradiation of $^6$Li-containing tritium-producing-burnable-absorber rods (TP-BARs) in light water nuclear reactors. However, quantities of tritium produced in this manner, and the resulting quantities of $^3$He produced by the decay of the tritium, may not be sufficient to satisfy $^3$He demand.

As the demand for neutron detectors and other commercial uses of $^3$He gas increases the demand for $^3$He will also increase. Conventional sources of $^3$He, such as harvesting $^3$He from decaying tritium in nuclear warheads, may not be sufficient to meet increased $^3$He demands. Some current estimates suggest that the annual global demand for $^3$He gas now exceeds the current annual supply of $^3$He gas. For example, while there is a relatively small amount of data regarding the current use of and/or demand for $^3$He, is the inventors estimate that the production of $^3$He gas in the United States may be approximately 8,000 L/year, while the global demand for $^3$He gas is estimated to be about 65,000 L/year, or 65 m$^3$/year.

Accordingly, the inventors have identified a need for an alternative method of harvesting or collecting $^3$He gas. The inventors have discovered that heavy water nuclear reactors may be one viable source from which $^3$He gas may be directly extracted or collected. It has been discovered that potentially useable amounts of $^3$He are produced within the heavy water contained the reactors, as either a moderator, coolant or both, and that this $^3$He can be directly harvested or extracted from the reactors without first separating, collecting and/or storing tritium outside the reactor. This direct extraction of $^3$He may be used as an alternative to, or in combination with known tritium collection processes. Some examples of heavy water reactors include pressurized heavy water reactors (such as Canada Deuterium Uranium (CANDU™) reactors), reactors including a heavy water moderator, reactors that use heavy water as a coolant and reactors that use heavy water as both a coolant and a moderator. Whether utilized as a moderator and/or a coolant, heavy water that is present within the nuclear reactor may be subject to thermal neutron activation to produce tritium, and decay of such tritium may form $^3$He.

Some commercial heavy water power reactors, such as CANDU™ reactors use heavy water (D$_2$O) in the moderator and heat transport systems. In such reactors, the moderator may be contained within a calandria vessel, and a cover gas, such as a moderator cover gas, is provided within the calandria in fluid communication to with free surface(s) of the moderator. Heavy water free surfaces may be present within the calandria vessel, and may also be present at one or more locations in other process piping, vessels and other portions of a moderator system.

The space above some or all of these free surfaces is filled with the moderator cover gas via a cover gas system. The free surfaces of the moderator heavy water do not need to be in communication with each other, and the moderator system may include multiple discrete regions in which moderator cover gas is in contact with a free surface of the heavy water. Optionally, all of the moderator cover gas can be circulated within a common cover gas system.

Typically, the moderator cover gas is substantially pure helium gas ($^4$He). For example, the cover gas may be at least 85% $^4$He and be at least 90%, at least 95% and/or at least 99% $^4$He by volume when the reactor is in use. When the reactor is in operation, one or more other gases and/or impurities may accumulate within the cover gas. For example, $D_2$ may be produced from radiolysis of the heavy water and may collect in the cover gas. Similarly, small amounts of $O_2$ (for example from radiolysis of heavy water, from $O_2$ added to promote $D_2$—$O_2$ recombination and/or from air leaks), $N_2$ (for example from air leaks), $CO_2$ possibly containing trace $^{14}$C (for example produced as an activation product of $^{17}$O in the moderator), $^{41}$Ar (an activation product of $^{40}$Ar which may be an impurity in the helium cover gas) and other gases, such as $T_2$ and DT may also accumulate in the cover gas.

A moderator cover gas system is provided to circulate the cover gas within the reactor and within each gas head space, and may include any suitable components and/or apparatus to help control the concentration of impurities in the cover gas or otherwise process the cover gas, including, for example, cover gas preheaters, recombination units, scrubbers, catalytic converters and flame arresters. Optionally, the cover gas can be processed to help control the concentration of impurities in the helium cover gas within desirable design limits (for example, less than about 3% $H_2$ by volume, less than about 2% $O_2$ by volume, and less than about 4% $D_2$ by volume). The cover gas system may also include one or more sources of fresh, pure helium, including, for example, helium bottle stations.

CANDU™ and other heavy water reactors may generate tritium ($^3$H) in the heavy water systems as a waste by-product during operation (for example, when used to generate electrical power). For example, tritium ($^3$H) may be produced within the moderator through thermal neutron activation of deuterium ($^2$H), via $^2$H(n,γ)$^3$H, and in the heat transport system (or coolant) of the heavy water reactor. The neutron radiative capture reaction $^2$H(n,γ)$^3$H is believed to be the dominant method of tritium production in heavy water reactors.

Some existing heavy water reactor facilities are configured to extract tritium from the heavy water used in the moderator and heat transport systems, for example using heavy water detritiation plants, to help reduce operator dose and environmental emissions. In such installations, the elemental tritium removed from the pressurized heavy water heat transport systems can be stored as titanium tritide in stainless steel storage vessels as a waste product. Eventually, the tritium will decay producing $^3$He gas. Such storage vessels may or may not include mechanisms for off-line recovery of the $^3$He gas. As these known processes include separating and storing tritium from the reactors and then harvesting $^3$He from the stored tritium, they may be referred to as in-direct $^3$He extraction processes.

While some $^3$He gas may be produced by the decay of tritium extracted from waste water storage tanks, the inventors believe that when heavy water reactors are in use a potentially useable quantity of $^3$He gas can be produced within the heavy water moderator and/or the heavy water coolant, and that at least some of the $^3$He gas can be directly extracted from these systems within the heavy water reactor (i.e. without first harvesting and/or storing tritium)

For example, the inventors believe that $^3$He may be produced within the moderator and that at least some of the $^3$He present in the moderator can escape the liquid (e.g. via diffusion and/or via bubbling up to the free surfaces surface) and may collect in a moderator cover gas that is provided over the free surfaces of the moderator. The heavy water moderator may be contained at relatively low pressures (relative to the heavy water used in the heat transport system), and may be at approximately atmospheric pressure.

Alternatively, or in addition, $^3$He may be produced within the heavy water coolant, and may escape the coolant and be collected in a cover gas provided in the heat transport system, including, for example the pressurized cover gas contained in the coolant pressurizer.

Instead of, or in addition to, removing and treating tritium-carrying heavy water from the heat transport system of the reactor, the inventors have discovered that at least a portion of the moderator cover gas, and optionally the coolant cover gas, can be extracted from reactor and can be treated or processed to separate the $^3$He gas from the cover gas. Extracting and processing the moderator cover gas and/or coolant cover gas may help collect at least some of the $^3$He gas produced in the moderator liquid. Conventional methods of collecting and storing tritium-carrying heavy water from the moderator or heat transport systems do not capture the $^3$He gas that is directly released from the moderator liquid and coolant and accumulates in the cover gases. In some configurations, extracting $^3$He from the moderator cover gas system may be more desirable than extracting $^3$He from the coolant cover gas because the heat transport system is an important safety system and it may not be desirable to modify or interfere with such a system.

The separated cover gas and/or extracted $^3$He gas can then be stored and/or sent for further processing. Separating $^3$He gas from the cover gas may, in some instances, be more desirable than processing waste heat transport heavy water and/or may help facilitate capture and collection of the $^3$He gas that is generated within the reactor and and escapes from the heavy water prior to the collection, processing and/or storage of the heavy water.

For example, in heavy water reactors, $^3$He gas may be formed in the moderator as a result of tritium β⁻ decay. The $^3$He gas formed may also be converted back to tritium via the reaction $^3$He(n,p)$^3$H, in the moderator. The thermal neutron absorption cross-section of the $^3$He(n,p)$^3$H reaction, in which the product of the tritium β⁻ decay is converted back to tritium, is believe to be about seven orders of magnitude greater than the cross-section for the reaction $^2$H(n,γ)$^3$H. However, it is believed that because of the low solubility of $^3$He gas in the heavy water moderator, at least a portion of the $^3$He gas formed in the moderator may escape irretrievably into the moderator cover gas provided above the moderator, before this back conversion reaction can occur. The $^3$He gas then mixes with the $^4$He forming the cover gas. Because it has been found that at least some $^3$He gas escapes the moderator, it is believed that the residence time of the $^3$He gas in the moderator may be too short to convert a significant amount of the $^3$He gas formed in the moderator back into tritium. Therefore, it is believed that there is the potential to recover useable and possibly commercially significant quantities of $^3$He gas formed in the moderator of CANDU reactors by extracting and processing the moderator cover gas. An example of an estimate of $^3$He gas production in a typically CANDU reactor is set out below.

If one assumes that the extent of the $^3$He(n,p)$^3$H reaction is negligible compared to the rate of $^3$He formation by tritium β$^-$ decay, then the rate of $^3$He production in the moderator is given by the rate of tritium β$^-$ decay. Consequently, the $^3$He production rate (atoms·s$^{-1}$) can be written as:

$$\frac{dN_{3He}}{dt} = \lambda M N_T \quad (1)$$

Where:
M=Total heavy water inventory in the Moderator (kg),
N$_{3He}$=Total number of $^3$He atoms in the moderator at time t (atoms),
N$_T$=Number of tritium atoms in the moderator per kg$_{D2O}$ at time t (atoms·kg$^{-1}$),
t=Time (s), and
λ=Tritium decay constant (s$^{-1}$).

To solve Equation 1, an estimate of the tritium concentration in the moderator as a function of time, t, is required. This can be done by using an example a mass balance for tritium in the moderator:

$$\frac{d}{dt}(MN_T) = \varphi \sigma N_D m \alpha + F_M N_0 - \lambda M N_T - L_R N_T \quad (2)$$

$$\frac{dN_T}{dt} + N_T\left(\lambda + \frac{L_R}{M}\right) = \varphi \sigma N_D \frac{m}{M} \alpha + \frac{F_M}{M} N_0 \quad (3)$$

Where:
F$_M$=Make-up heavy water flow (kg·s$^{-1}$),
L$_R$=Heavy water loss rate (kg·s$^{-1}$),
N$_D$=Number of deuterium atoms in the moderator per kg$_{D2O}$ (atoms·kg$^{-1}$),
N$_0$=Number of tritium atoms in the make-up heavy water per kg$_{D2O}$ (atoms·kg$^{-1}$),
a=Reactor capacity factor,
m=Heavy water inventory under the neutron flux (kg),
t=time (s),
φp=Thermal neutron flux (neutrons·cm$^{-2}$·s$^{-1}$), and
σ=Thermal neutron absorption cross-section (cm$^2$)

Equation 3 is derived based on the simplifying assumption that the conversion of $^3$He, the tritium β$^-$ decay product, back to tritium in the moderator is negligible. The general solution to Equation 3 is given by:

$$N_T = N(0)e^{-\lambda_e t} + \frac{\left(S + \frac{F_M}{M}N_D\right)}{\lambda_e}[1 - e^{-\lambda_e t}] \quad (4)$$

Where:

$$S = \varphi \sigma N_D \frac{m}{M} \alpha$$

$$\lambda_e = \lambda + \frac{L_H}{M}, \text{ and}$$

$N(0)$ = Initial tritium activity in the moderator.

The heavy water loss rate may vary from reactor to reactor and there is no single value that can be used to describe a standard CANDU 6 reactor. For this reason, the case where, N$_0$=0 and L$_R$=F$_M$=0, was used to simplify Equation 4 as given by (it is believed that the simplifying assumptions used here lead to an overestimation of the tritium activity in the moderator):

$$N_T = N(0)e^{-\lambda t} + \frac{S}{\lambda}(1 - e^{-\lambda t}) \quad (5)$$

Equation 5 based on the simplifying assumptions, described above, may overestimate the tritium activity in the moderator. The specific tritium activity (Bq·kg$^{-1}$) in the heavy water at time t can now be written as:

$$A = \lambda N_T = \lambda N(0)e^{-\lambda t} + S(1 - e^{-\lambda t}) \quad (6)$$

For $N(0)=0$, $$A = S(1 - e^{-\lambda t}) \quad (7)$$

The tritium activity (A) in the moderator (Bq·kg$_{-1}$) of a CANDU reactor can be estimated from Equation 6 provided that all the parameters in the equation are known. These values were used to calculate the tritium activity in the moderator of a CANDU 6 reactor as a function of time. The parameter values are shown in Table 1 [adopted from M. J. Song, S. H. Song, C. H. Jang, Waste Management, 15, 8, 593 (1995)].

TABLE 1

Parameter Values in Equation 3 for a CANDU 6 Reactor

| Parameter | | Value |
|---|---|---|
| F$_M$ | Make-up heavy water flow (kg · s$^{-1}$) | Reactor Dependant |
| L$_R$ | Heavy water loss rate (kg · s$^{-1}$) | Reactor Dependant |
| M | Total heavy water inventory in the Moderator (kg) | 2.57 × 10$^5$ |
| N$_T$ | Number of tritium atoms in the moderator per kg D2O (atoms · kg$^{-1}$) | Variable |
| N$_D$ | Number of deuterium atoms in the moderator per kg D2O (atoms · kg$^{-1}$) (The isotpic purity of heavy water in the moderator ≥99.75%) | 6.01 × 10$^{25}$ |
| N$_0$ | Number of tritium atoms in the make-up heavy water per kg$_{D2O}$ (atoms · kg$^{-1}$) | 0 |
| a | Reactor capacity factor (A value of 85% is assumed) | 85% |
| m | Heavy water inventory under the neutron flux (kg) | 1.90 × 10$^5$ |
| φ | Thermal neutron flux (neutrons · cm$^{-2}$ · s$^{-1}$) | 2.30 × 10$^{14}$ |
| σ | Neutron absorption cross-section (cm$^2$) | 4.19 × 10$^{-28}$ |
| λ | Tritium decay constant (s$^{-1}$) | 1.78 × 10$^{-9}$ |

Figure 5:
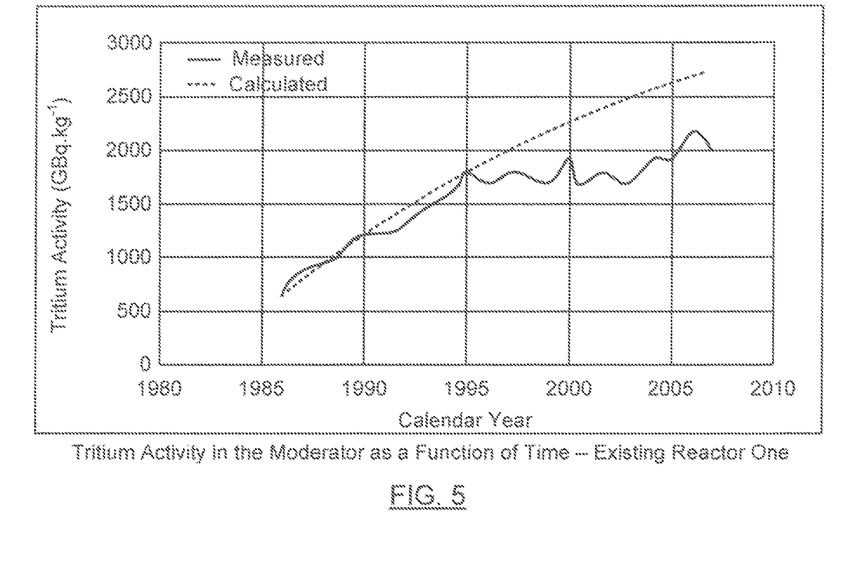
FIG. 5 is a plot of moderator tritium activity in the moderator as a function of time for one known reactor.
Figure 6:
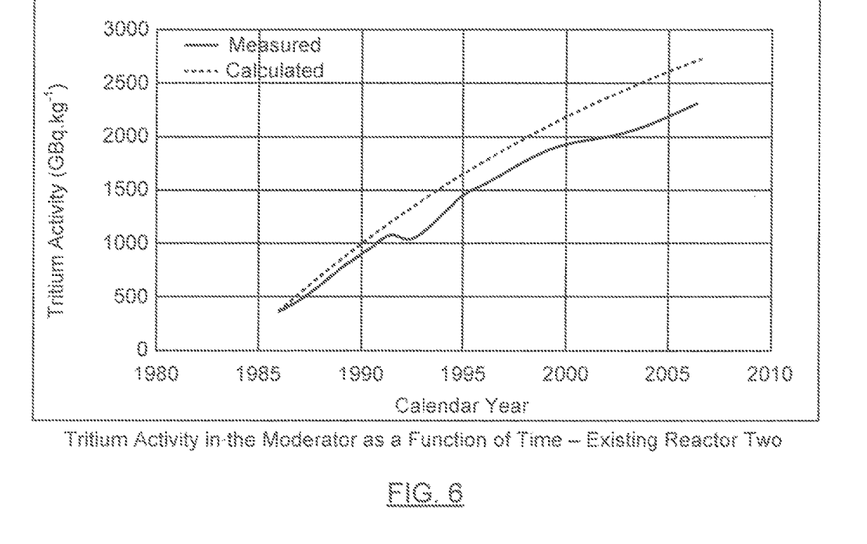
FIG. 6 is a plot of moderator tritium activity in the moderator as a function of time for another known reactor.

The use of Equation 6 to estimate the evolution of the moderator tritium activity with time was validated by comparing the data calculated using Equation 6 and actual moderator activity data from two existing CANDU reactors. These comparisons are shown in FIG. 5 and FIG. 6, respectively. Considering the simplifying assumptions used in the derivation of Equation 6, the calculated moderator activity values follow the measured values reasonably well. As expected the calculated values were higher than the measured values due to a variety of assumptions used in the derivation of Equation 6, including for example no loss of tritium from the moderator, other than from decay, a capacity factor of 85% and flux of 2.30×10$^{14}$. Also these results suggest that the contribution of reaction $^3$He(n,p)$^3$H to the production of $^3$H in the moderator is not important. The results confirm the validity of Equation 6 and hence Equation 5 for use in estimating the tritium activity in the moderator in CANDU reactors, under the assumption that there is no loss of tritium from the moderator other than from decay.

The $^3$He production rate in the moderator (Equation 1) can now be written as:

$$\frac{dN_{3_{He}}}{dt} = \lambda M N_T = \lambda M N(0) e^{-\lambda t} + SM(1 - e^{-\lambda t}) \quad (8)$$

$$N_{3_{He}} = SMT + \left(MN(0) - \frac{SM}{\lambda}\right)(1 - e^{-\lambda t}) \quad (9)$$

For the case where $N(0) = 0$, Equation 9 simplifies to:

$$N_{3_{He}} = SMt - \left(\frac{SM}{\lambda}\right)(1 - e^{-\lambda t}) \quad (10)$$

Figure 7:
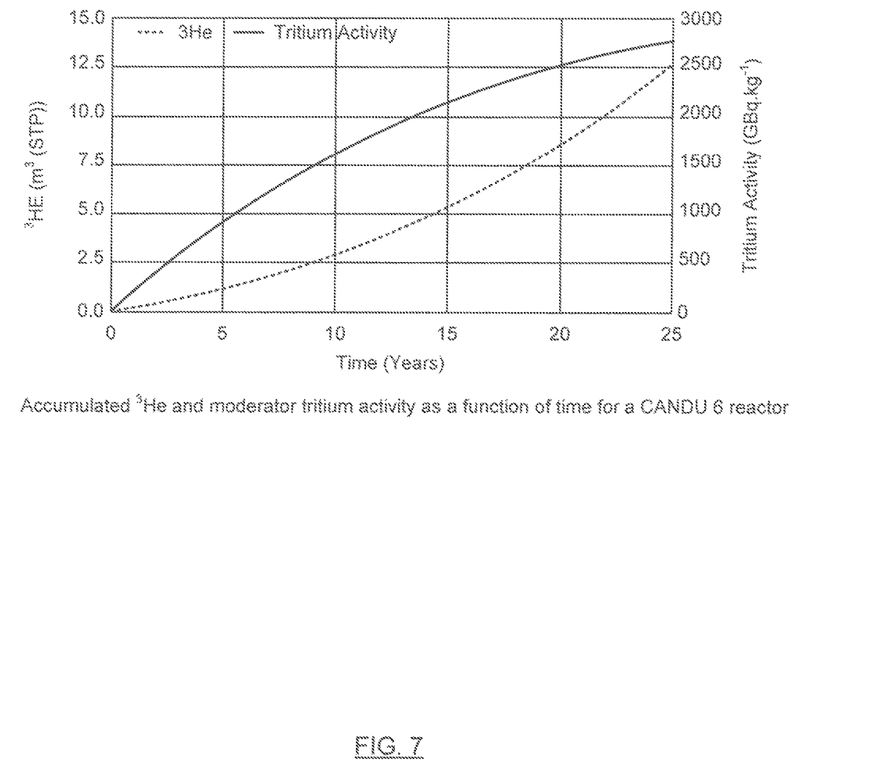
FIG. 7 is a plot of accumulated $^3$He and moderator tritium activity as a function of time.

Equation 8 gives an upper-bound estimate of the production rate of $^3$He in the moderator for a CANDU 6 reactor and Equation 9 gives an upper-bound estimate of the total number of $^3$He atoms in the moderator as a function of time. FIG. 7 shows the upper-bound estimates for total $^3$He produced in the moderator and moderator tritium activity as a function of time.

An estimate of the design life of current CANDU 6 reactors and the pressure tubes, at a capacity factor of 85%, may be 40 and 25 years, respectively. As FIG. 7 shows, over the design life of the pressure tubes, a typical CANDU 6 reactor generates about 12.7 m$^3$ (STP) of $^3$He in the moderator, assuming that there is no loss of tritium from the moderator through heavy water leaks, replacement, detritiation, or evaporation to the moderator cover gas. This amounts to an upper-bound, average $^3$He production rate of ~0.8 m$^3$ (STP) per year. As the data show an amount of $^3$He (<<1 m$^3$ (STP) per annum) may be available for recovery from a CANDU reactor from the moderator cover gas.

The tritium activities in the moderators and the $^3$He production rates at different CANDU reactors in Canada are different. Table 2 shows the $^3$He production rate as a function of the tritium activity in the moderator for a typical CANDU 6 reactor. As the data show, even at the highest moderator activity used in the calculations, which is similar to the measured tritium activity in the Existing Reactor Two moderator in 2007, the $^3$He production rate is <0.7 m$^3$(STP) per year.

TABLE 2

Estimated $^3$He Production Rate per Year in a CANDU 6 Reactor

| Moderator Activity (GBq · kg$^{-1}$) | $^3$He Production Rate (m$^3$(STP) · a$^{-1}$) |
|---|---|
| 370 | 0.11 |
| 740 | 0.22 |
| 1110 | 0.34 |
| 1480 | 0.45 |
| 1850 | 0.56 |
| 2220 | 0.67 |

Based on the above, it is believe that the amount of $^3$He gas in the extracted moderator cover gas is significantly higher than the amount of naturally abundant $^3$He found in the helium cover gas. That is, the moderator cover gas within the calandria may be $^3$He enriched. If $^3$He gas is to be extracted from collected moderator cover gas, it may be desirable to capture a significant portion of the $^3$He enriched cover gas in the calandria, and preferably to capture substantially all of the $^3$He enriched cover gas, for processing.

In operation, some of the moderator cover gas may escape from the calandria and/or the moderator cover gas system. If, for example, a daily helium loss rate of 30% of the total helium inventory in the moderator cover gas system is assumed, it is believed that recovering about 800-900 m$^3$ per year of helium may help facilitate recovery of most of the $^3$He produced in a CANDU 6 reactor. Table 3 shows the concentration of $^3$He in the recovered helium gas, as a function of the average moderator activity.

TABLE 3

Estimated Concentraion of $^3$He in the Recovered Helium Gas

| Moderator Activity (GBq · kg$^{-1}$) | $^3$He in Recovered Helium (ppm V) |
|---|---|
| 370 | 130 |
| 740 | 260 |
| 1110 | 410 |
| 1480 | 540 |
| 1850 | 670 |
| 2220 | 800 |

Preferably, the cover gas system can be configured so that impurities in the moderator cover gas, including, for example, $D_2$, $O_2$, $CO_2$, $^{14}C$, $^{41}Ar$, $T_2$ and DT, can be removed from the helium cover gas before the cover gas is processed to separate the $^3$He gas from the $^4$He gas.

Optionally, the extraction of the cover gas can be an off-line process, when the reactor is shut down and/or the cover gas system(s) are purged allowing substantially all of the enriched cover gas to be collected in a single batch. This may allow the cover gas to be batch processed to extract the $^3$He gas, which may be advantageous for some extraction process and/or apparatuses. It may also be desirable if the reactor is going to be shut down anyway (for example for service).

Alternatively, the extraction of the cover gas can be an on-line process, in which a stream (optionally a generally continuous stream) of cover gas can be drawn from the calandria and/or the heat transport system (e.g. the pressurizer) while the reactor is in use. Optionally, in such a configuration the $^3$He gas can be separated from the extracted stream of cover gas using a real time or on-line process or separation apparatus. This may allow the $^3$He gas to be extracted while the reactor is in use. This may help facilitate substantially continuous collection of $^3$He gas Optionally, after the $^3$He gas has been separated, some or all of the cover gas extracted from the calandria can be recycled and reintroduced into the calandria. Cover gas from the heat transport system may also be treated and recycled. Recycling at least some of the cover gas may help reduce the amount of make up or replacement cover gas needed and/or may help increase the efficiency of the cover gas system.

The $^3$He gas can be separated from the $^4$He cover gas using any suitable separation apparatus and/or separation technique. For example, a number of technologies have been used in the past for separating $^3$He from $^3$He+$^4$He mixtures. Examples of some of the known methods include:
  1. Thermal Diffusion
  2. Fractional Distillation
  3. "Heat-Flush" Method
  4. "Super Leak" Method
  5. Cryogenic Adsorption Thermal Diffusion Before the extraction of $^3$He from tritium decay started, there have been efforts to separate naturally abundant $^3$He from helium sources (extracted from air or natural gas).

Thermal diffusion has one of the early technologies tested for use in enriching naturally abundant $^3$He in helium sources.

Thermal diffusion is the relative motion of the components of a gaseous mixture or solution, which is established when there is a temperature gradient in a medium. Thermal diffusion in gases was theoretically predicted by Enskog on the basis of the kinetic theory of gases [D. Enskog, Physik Zeits, 12, 56 and 533 (1911)]. It was later discovered experimentally by Chapman and Dootson [S. Chapman, F. W. Dootson, Phil. Mag., 33, 248 (1917)]. Thermal diffusion sets up a concentration gradient with lighter molecules concentrating at the high-temperature side with heavier molecules concentrating in the low-temperature side leading to separation of components in a gaseous mixture. The concentration gradient in turn causes ordinary diffusion and the separation effect of thermal diffusion is balanced by the counteraction of the concentration diffusion.

In a binary gaseous mixture at constant pressure, the total diffusion mass flux, $J_i$, for each component, i, in the absence of external forces, is given by:

$$J_i = -nD_{12} \nabla C_i + nD_T \frac{1}{T} \nabla T = -nD_{12}\left[\nabla C_i - k_T \frac{1}{T} \nabla T\right] = -nD_{12}[\nabla C_i - aC_1 C_2 \nabla \ln T] \quad (11)$$

Where:
$C_i$=Concentration of species i ($C_i$=$n_i$/n, 1=1,2)
$D_{12}$=Binary diffusion coefficient,
$D_T$=Thermal diffusion coefficient,
n=Total number of molecules in unit volume (n=$n_1$+$n_2$)
$k_T$=Thermal diffusion ratio=$D_{12}$/$D_T$=$\alpha C_1 C_2$
$\alpha$=Thermal diffusion constant In gaseous mixtures $\alpha$ does not generally exceed 0.4; and for mixture of isotopes, a typical value for $\alpha$ is ~0.01. The value of $k_T$ depends in a complex manner on the molecular masses, effective molecule size, temperature, mixture composition, and on the laws of intermolecular interaction. The closer the intermolecular forces approach the laws of interaction between the elastic, solid, spheres, the greater is the value of $k_T$; it also increases with increase in the molecule dimension and mass ratio. When molecules interact in accordance with the law for solid, elastic, spheres, $k_T$ is independent of the temperature and the heavier molecules gather, in this case, in the cold region ($k_T$>0 for $m_1$>$m_2$>2 where $m_1$ and $m_2$ are the masses of the respective components), but if $m_1$ and $m_2$ are equal, then larger molecules move into a cold region. For other laws of intermolecular interaction $k_T$ can depend considerably on the temperature and can even change sign.

Thermal diffusion became important as a method of separating isotopes or mixtures of gases when Clusius and Dickel invented the thermal-diffusion column [K. Klusius, G. Dickel, Naturwiss, 26, 546 (1938)]. The original thermal diffusion column theory was developed by Furry, Jones and Onsagar (FJO) [W. H. Furry, R. C. Jones, L. Onsager, Phys. Rev., 55, 1083 (1939)], [W. H. Furry, R. C. Jones, Phys. Rev., 69, 459 (1946)], [R. C. Jones, W. H. Furry, Rev. Mod. Phys., 18, 151 (1946)]. A thermal diffusion column, used for isotopes separation, essentially consists of a vertical tube maintained at a low temperature with a heated wire located in the central axis. Other variants include coaxial, tube-in-tube configuration, where the central tube is heated and maintained at a high temperature while outer tube is maintained at a lower temperature. In a thermal diffusion column, the lighter gas flows upwards near the central hot wire or tube and the heavier gas flows downwards near the outside cold wall, by convection. The temperature gradient across the tube causes a horizontal concentration gradient by thermal diffusion with the lighter molecules concentrating at the hot central wire or tube and the heavier molecules concentrating at the cold wall. These two effects are superimposed and the opposing convection currents carry the lighter molecule to the top and the heavier molecule to the bottom. The upward and downward gas flows are in counter flow resulting in a concentration gradient between the top and the bottom of the column greater than in a horizontal plane. The maximum separation factor that can be obtained in a column is limited by the remixing of gases caused by ordinary or concentration diffusion and by the convection currents. For a binary mixture, modified set of FJO equations describing the mass transport of species in the Thermal Diffusion column is given in [L. Hodor, Sep. Sci. Technol., 38, 5, 1229 (2003)].

The effectiveness of thermal diffusion as a means of separating $^3$He from oil-well helium ($^3$He/$^4$He=1×10$^{-7}$) has been investigated by several groups. McInteer et al. [B. B. McInteer, L. T. Aldrich A. O. Nier, Phys. Rev. 74, 8, 946 (1948)], using a 3-column thermal diffusion system, were able to produce 14 cm3(STP) per day of 0.21% $^3$He using a 1.15×10$^{-5}$% $^3$He feed, which corresponds to a separation factor of 1.83×10$^4$, under the test conditions. The thermal diffusion system used consisted of two 3.5 m-long coaxial, tube-in-tube columns in the front end. The first column had a hot wall diameter of ~6.04 cm and cold wall diameter of 7.3 cm and the second column had a hot wall diameter of 3.5 cm and a cold wall diameter of 4.76 cm. The final column consisted of a 2.5 m-long hot-wire column of wire diameter 0.036 cm. The columns were operated at high pressure (0.69 and 0.88 MPa(g)). The separation factor achieved, under the tested conditions, was found to be a strong function of the product draw-off rate and it decreased with increasing draw-off. It was also found that the hot-wire column alone could have a separation factor in the order of 1×10$^4$.

A thermal diffusion plant capable of producing 2 cm$^3$ (STP) per week was also operated for several years at an existing establishment at Harwell, England for several years using a feed gas containing naturally abundant $^3$He in helium from air (1.2×10$^{-4}$% $^3$He). The thermal diffusion system consisted of two identical coaxial, tube-in-tube columns (0.8 cm diameter hot wall×3 cm diameter cold wall× 4.5 m high) at the front end and a hot-wire column (1.3 cm diameter cold wall×4.57 m high) at the back end.

With the feed gas that is available from CANDU reactors, it is believed that an overall separation factor of about 1×10$^3$ to about 1×10$^4$ may be required to obtain a stream of $^3$He with 99.9% purity. However, for the recovery of $^3$He from the available feeds, a large volume of recovered helium gas (~840 m$^3$) needs to be processed. While thermal diffusion is a relatively straightforward method of isotope separation, as a separation process, it may have a low thermodynamic efficiency, requires multiple stages, large amounts of electrical power and long processing times. However, thermal diffusion may be suitable as a final stage of $^3$He enrichment since, a single hot-wire column could have a separation factor in the order of 1×10$^4$.

Fractional Distillation

The boiling points of $^4$He and $^3$He are 4.2 K and 3.9 K respectively and $^3$He+$^4$He mixtures may be separated by distillation. Distillation of $^3$He+$^4$He solutions is generally considered as a more efficient method than the thermal diffusion method for the separation of $^3$He isotope. The separation factor for thermal diffusion is proportional to the square root of the isotopic mass ratio which is fixed at 1.5 while the separation factor for distillation is proportional to the relative volatility ratio and the minimum separation factor for $^3$He+$^4$He distillation is 2.5 at the critical temperature of 3.36 K, and increases with decreasing temperature. Several small-scale, batch distillation processes have been reported for the purification of $^3$He+$^4$He mixtures relatively rich in $^3$He [W. R. Abel, A. C. Anderson, W. C. Black, J. C. Wheatley, Physics, 1, 337 (1967)], [V. N. Grigor'ev, B. N. Yesel'son, V. A. Mikheev, O. A. Tolkacheva, Sov. Phys., J.E.T.P., 25, 572 (1976)], [R. H. Sherman, Proceedings of the 10th International Conference on Low-Temperature Physics, Vol. 1, 188 (1966)], [R. P. Giffard, R. B. Harrison, J. Hatton, W. S. Truscot, Cryogenics, 7, 179 (1967)], [A. C. Anderson, Cryogenics, 8, 50 (1968)], [A. Tominaga, S. Kawano, Y. Narahara, J. Phys., D: Appl. Phys. 22, 1020 (1989)]. The $^3$He in the feed used in these studies varied from 10 to 99.9993% and $^3$He product purity varied from 99.99% to 99.9998%. The production rate of $^3$He in these processes was reported to be in the range 0.1 to 18.5 L·h$^{-1}$. The objective of most of these processes was essentially to remove the $^4$He impurity traces in enriched $^3$He. These data, however, show the potential of the fractional distillation process to obtain very high purity $^3$He.

A continuous distillation apparatus for the separation of $^3$He-$^4$He mixtures is described in W. R. Wilkes, Advances in Cryogenic Engineering, 16, 298 (1970), the entirety of which is incorporated herein by reference. This system has been operated continuously for few hours at a time with a $^3$He-$^4$He mixture containing 8.7% $^3$He in the feed while withdrawing a product containing 99.95% $^3$He and a raffinate containing 0.02% $^3$He. Based on the data obtained, the author concluded that at a feed rate ~60 L(STP)·h$^{-1}$ of this mixture, a 99.9% pure $^3$He product may be obtained at a rate of ~5.2 L·h$^{-1}$. A continuous distillation process of this size is suitable as a final stage of enriching $^3$He in $^3$He+$^4$He mixtures recovered from the moderator cover gas. However, this requires pre-enriching the $^3$He content in $^3$He+$^4$He mixtures, recovered from the moderator cover gas from CANDU reactors, for use as feed for a distillation system of similar size.

Heat Flush Method

The "heat flush" method of $^3$He-$^4$He isotopes separation is based on superfluid properties of $^4$He. The "heat flush" method exploits the property that $^3$He does not participate in the superfluid flow of $^4$He. It has been demonstrated that if heat is applied at one end of a vessel containing liquid helium below the lambda point ($\lambda$) and refrigeration at the other end, the $^3$He flows with the normal liquid away from the heater and towards the cold end of the vessel [C. T. Lane, H. A. Fairbank, L. T. Aldrich, A. O. Nier, Phys. Rev. 73, 256 (1948)], [T. Soller, W. M. Fairbank, A. D. Crowell, Phys. Rev. 91, 1058 (1953)]. The $\lambda$ point is the temperature below which normal fluid helium (helium I) transitions to the superfluid helium point (helium II).

The $\lambda$ temperature of $^4$He in $^3$He+$^4$He solutions decreases with increasing $^3$He content in the solution. Consequently, at any given temperature there is a $^3$He concentration, above which $^4$He is no longer a superfluid. This, in effect, imposes a limitation on the enrichment of $^3$He that can be achieved using methods that exploit superfluid properties of $^4$He. The "heat flush" method has been used to enrich gas-well helium (~1×10$^{-7}$) by a factor of 130 [C. T. Lane, H. A. Fairbank, L. T. Aldrich, A. O. Nier, Phys. Rev. 73, 256 (1948)] and 3×10$^4$. In the latter case, up to 0.5% of $^3$He in $^3$He+$^4$He mixtures were obtained at a rate of about 60-75 cm$^3$ of enriched gas. A device combining the "heat flush" method with batch distillation, capable of enriching $^3$He from natural abundance level (~1×10$^{-8}$) to ~99.5% has also been demonstrated [V. P. Peshkov, J. Exp. Theor. Phys, 30, 850 (1956), Translation: Soviet Physics, JETP, 3, 706 (1956)]. In this case, product of the "heat flush" step was ~0.2% of $^3$He. There have been no reports of enrichment of $^3$He in $^3$He+$^4$He mixtures above ~1.5% directly by the "heat flush" method. A final enrichment up to 4% of $^3$He has been achieved by the "heat flush" method using pre-enriched mixture of $^3$He-$^4$He up to 0.01% $^3$He by thermal diffusion method. While the "heat flush" method may not achieve enrichment of $^3$He significantly above few percent, it may be used as a suitable pre-enrichment process for separating $^3$He from the moderator cover gas recovered from CANDU reactors.

Superleak Method

The "superleak" method of separating $^3$He-$^4$He gas mixtures is also based on the superfluid properties of $^4$He. The method of "superleak" is based on the ability of superfluid $^4$He to flow through capillaries or very narrow channels, while $^3$He cannot. This method has been used to partially enrich $^3$He present in atmospheric helium at an abundance ratio of 1.22×10$^{-6}$. The "superleak" consisted of a ground glass joint with a channel width of ~1 µm. Using ten parallel superleaks of dimension 1×10$^{-4}$ cm, a $^3$He+$^4$He mixture containing 2% $^3$He was enriched to 95%, in a single operation, while processing the initial gas mixture at a rate of 200 cm$^3$ (STP) per hour. Since the "superleak" method is believed to be capable of enriching $^3$He to significant levels from relatively dilute $^3$He+$^4$He mixtures in a single operation, the "superleak" process may be a suitable pre-enrichment process that could be coupled to a fractional distillation stage to achieve high-purity $^3$He.

Cryogenic Adsorption Method

The adsorption based separation of $^3$He-$^4$He, at liquid helium temperature, is based on the differences in the adsorption energies of $^3$He and $^4$He on activated charcoal. This method has been used to remove trace amounts of $^4$He impurity (~0.1%) in commercially available $^3$He. A reduction in the $^4$He impurity from 0.1% to <0.01% has been achieved after two passes through the column of 25 L of at a flow rate in the range 0.04-0.1 L·min$^{-1}$. About 23 L of purified product and ~2 L of $^4$He enriched gas were recovered. No details on the amount of charcoal used in the process or the $^4$He adsorption capacity of charcoal at liquid helium temperature are given. No other reports on using the cryogenic adsorption of $^4$He on charcoal at high $^4$He levels are found in the literature. This method, while simple, may be more appropriate for removing $^4$He impurity at trace levels in enriched $^3$He.

Using one or more of the apparatuses and processes described above, and optionally using any other suitable apparatus and/or process, there are several processing options are available for consideration for the processing of moderator cover gas recovered from CANDU reactors to extract high purity $^3$He. Some examples of processing options include:

1. Pre-enrichment with "heatflush" method and final enrichment with distillation,
2. Pre-enrichment with "superleak" method and final enrichment with distillation, and
3. Pre-enrichment with "superleak" method and final enrichment with thermal diffusion.

Figure 1:
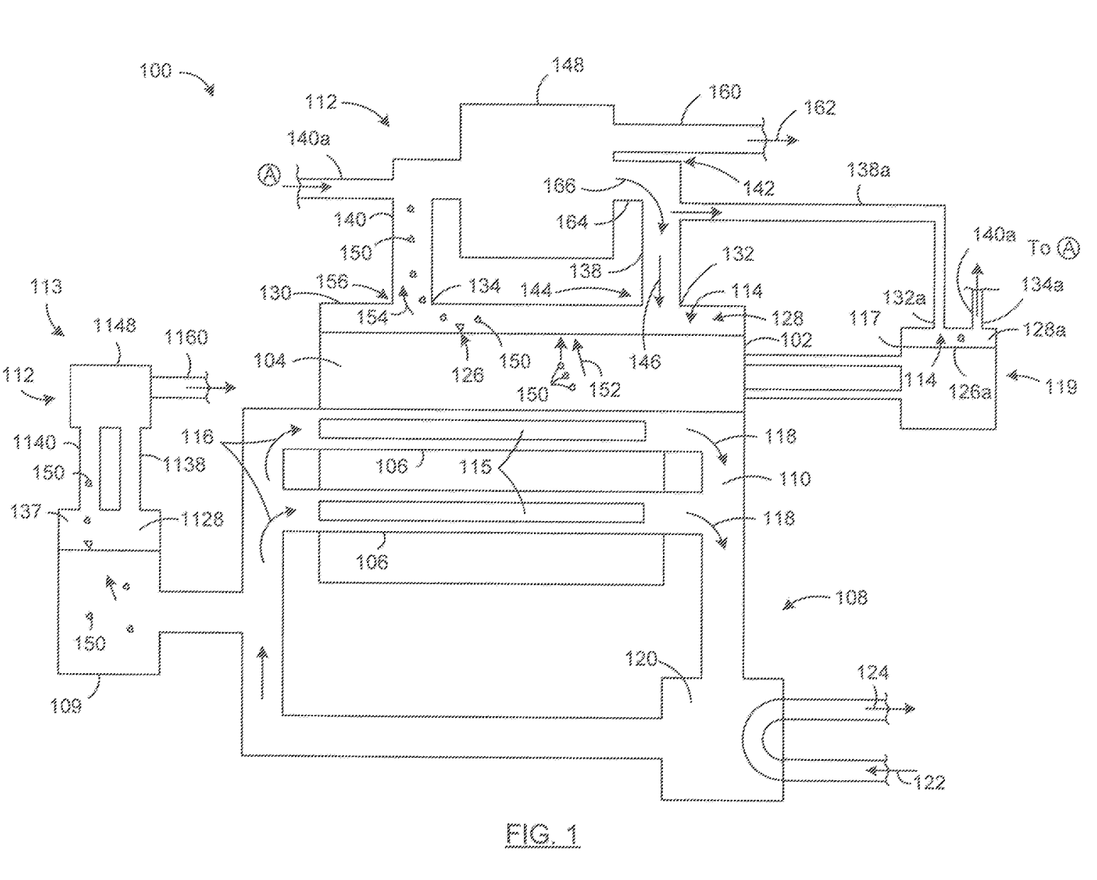
FIG. 1 is a schematic representation of a heavy water nuclear reactor.

Referring to FIG. 1, a schematic representation example of a heavy water reactor, e.g. a CANDU reactor 100, includes a calandria 102 containing a heavy water moderator liquid 104 and a plurality of pressure tubes 106 extending through the calandria 102. A heat transport system 108 is used to circulate a cooling fluid 110 through the pressure tubes, and includes a pressurizer 109. A moderator cover gas system 112 is used to circulate and optionally treat or process a moderator cover gas 114, and a coolant cover gas system 113 is used to circulate and optionally treat a coolant cover gas 137. Optionally, the moderator cover gas 114 and the coolant cover gas 137 may be the same gas, such as helium.

The pressure tubes 106 may be of any suitable design and can contain one or more nuclear fuel bundles/rods 115. The reactor 100 can include any suitable number of pressure tubes 106, arranged in any suitable configuration. The pressure tubes 106 can be formed from any suitable material.

The heat transport system 108 may be used to circulate a pressurized heavy water cooling fluid 110 through the pressure tubes 106. Incoming heavy water cooling fluid enters the tubes 106, illustrated by arrows 116, is heated by the fuel bundles 115 and exits the pressure tubes 106, illustrated by arrows 118 at an elevated temperature. The high temperature cooling fluid may then flow through any suitable heat exchanger, for example a boiler 120 that can be used to heat an incoming water stream 122 to generate a steam stream 124, which may in turn be used to drive any suitable turbine generator (not shown) and produce electrical power. The heat transport system 108 may include any suitable fixtures and components including, for example, valves, pumps, filters and any other suitable apparatus that is not illustrated in the present schematic drawing.

The moderator liquid 104 is contained within the calandria 102 and surrounds the pressure tubes 106. A moderator system 119 circulates the moderator through the calandria, and can include any suitable piping, conduits, processing modules (such as a heat exchanger), valves, pumps and other such components. In the illustrated schematic, a moderator vessel 117 holds moderator liquid that is outside the calandria.

The moderator liquid 104 may have exposed free surfaces 126 at a plurality of locations within the moderator system 115. For example, a free surface 126 is located toward the top of the calandria 102. A head space or plenum 128 is defined between the free surface 126 of the moderator fluid 104 and the upper wall 130 of the calandria. While illustrated as a single, continuous chamber, the head space 128 may be formed from two or more separate chambers or regions within the calandria 102, and need not be a single, continuous chamber. The size and shape of the head space 128 may be selected based on a variety of factors, including, for example the calandria size, the calandria shape, the configuration of the cover gas system 112 and the operating conditions of the reactor 100.

A free surface 126a may also be formed within a head space 128a in vessel 117, and optionally within some of the conduits or piping of the moderator system 115. Each head space 128 and 128a may be filled with moderator cover gas, and may be in fluid communication with a common moderator cover gas system 112. Cover gas system features described in relation to the calandria 104 and head space 128 may also be included in vessel 117 and head space 128a, and analogous elements may be identified using analogous reference characters with an "a" suffix.

The calandria 104 may include a gas inlet 132 and a gas outlet 134 that are in fluid communication with each other, for example via the cover gas head space 128, and that can be connected to any suitable cover gas system 112. While illustrated as a single port for clarity, the gas inlet 132 may include a plurality of discrete ports or openings in the calandria sidewall and the supplying conduit may have a corresponding number of branches and outlets. Similarly, the gas outlet 134 may include a plurality of separate ports or openings that are in communication with the cover gas head space 128, and connected to a common outlet passage.

The cover gas 114 can flow into the head space 128 via the gas inlet 132 and can be extracted from the head space 128 via the gas outlet 134. Optionally, the gas inlet 132 and gas outlet 134 can include any suitable valve(s) or flow control mechanism to selectably adjust and/or limit the flow of cover gas 114 within the head space 128. The gas inlet 132 and gas outlet 134 may also include any other suitable equipment, including, for example, a flow meter and sensors.

The cover gas system is used to supply cover gas 114 to the calandria 104 and to circulate the cover gas 114 through the head space 128. The cover gas system 112 can be of any suitable configuration, and may include any suitable components or apparatuses. In the illustrated example, the cover gas system 112 includes a cover gas supply passage 138 for supplying cover gas 114 to the head space 128, and a gas extraction passage 140 for extracting gas from within the head space 128. The passages 138, 140 may be formed from any suitable conduit members, including, for example pipes and ducts, and may be formed from any material that is suitable for use with a pressurized heavy water reactor.

In the illustrated example, the cover gas supply passage 138 has an upstream or inlet end 142 and downstream or outlet end 144 that is spaced apart from the inlet end 142. The outlet 144 of the supply passage 138 is connectable to the gas inlet 132 on the calandria 104. In this configuration, cover gas 114 may be supplied into the head space 128 via the supply passage 138, as illustrated using arrows 146. When contained within the head space 128, the cover gas 114 is in contact with the free surface 126 of the moderator liquid 104.

The inlet 142 of the cover gas supply passage 138 can be connected to any suitable supply or source of cover gas 114. In the illustrated example, the inlet 142 of the cover gas supply passage 138 is connected to a separation apparatus 148, as explained in greater detail below. Alternatively, the inlet 132 may be connected to a helium bottle (not shown) or other cover gas supply source.

As explained in detail above, when the reactor 100 is operated a quantity of tritium may be produced within the moderator liquid. The tritium may then decay to produce $^3$He gas 150 in the moderator liquid 104. Due to the relatively low solubility of $^3$He gas in the heavy water moderator 104, at least a portion of the $^3$He gas 150 produced may form bubbles, diffuse out of the free surfaces 126 or otherwise escape from the moderator liquid, as illustrated using arrows 152. $^3$He gas bubbling out of the moderator liquid 104 can flow into the head space 128, and may become mixed with the cover gas 114 contained in the head space 128.

Optionally, as explained above, the cover gas 114 introduced into the head space may be substantially pure helium ($^4$He) gas. When the $^3$He gas 150, and other impurities and by-products as explained above, flow into the head space 128, the composition of the cover gas 114 may change from substantially pure helium ($^4$He) to a mixture of gases. The mixture of gases may be extracted from the head space 128 via the gas outlet 134 as a gas outlet stream, represented by arrow 154. In this configuration the gas outlet stream 154 may include a mixture of the helium cover gas 114 and at least a portion of the $^3$He gas 150.

In the illustrated example, an inlet end 156 of the gas extraction passage 140 is coupled to the gas outlet 134 of the calandria 104 to extract the gas outlet stream 150 from the head space 128. The gas outlet stream 154 can flow along the gas extraction passage 140, away from the head space 128, for further treatment and/or processing.

One or more suitable gas treatment and/or processing apparatuses can be provided in the gas extraction passage 140, downstream from the head space 128. Some examples of suitable gas processing apparatuses are explained above. The processing apparatuses can be selected to process the gas outlet stream in a variety of different ways. In addition to, or as an alternative to known gas processing apparatuses, the cover gas system 112 includes a $^3$He gas separation apparatus 148 that is operable to separate $^3$He gas 150 from the mixture of gases forming the gas outlet stream 154. The $^3$He gas separation apparatus 148 may be of any suitable configuration and can include one or more gas separation modules. Some examples of suitable $^3$He gas separation apparatuses are explained in detail above, and any one of these apparatuses can be used alone and/or in combination with any one or more of the other apparatuses described herein or any other suitable apparatus. One or more suitable gas processing apparatus (for example apparatuses to remove other impurities, such as $D_2$, $O_2$, $CO_2$ and $^{41}$Ar from the cover gas gas) may be provided upstream and/or downstream from the $^3$He separation apparatus.

In the illustrated example, the $^3$He gas separation apparatus 148 includes a $^3$He gas outlet passage 160 to output a stream 162 of $^3$He gas separated from the outlet gas stream 154. The $^3$He gas outlet passage 160 can be connected to any suitable downstream apparatus including, for example, a storage container and/or secondary processing apparatus (not shown).

Optionally, the $^3$He gas separation apparatus 148 may also include at least one other outlet to output non-$^3$He gas streams. In the illustrated example, the $^3$He gas separation apparatus 148 includes a second outlet 164 for outputting a treated cover gas stream 166. The treated cover gas stream 166 may include the helium cover gas from which the $^3$He gas was separated, and may include other trace gases and/or impurities. In the illustrated example, the non-$^3$He gas outlet 164 is coupled to the inlet 142 of the cover gas supply passage 138. In this configuration, treated cover gas 166 (i.e. cover gas that has had the $^3$He gas removed) can be re-used and recycled into the head space 128. Alternatively, the non-$^3$He gas outlet 164 need not be coupled to the cover gas supply passage 138, and the non-$^3$He gas exiting the separation apparatus 148 can be contained or disposed of in any suitable manner. Optionally, one or more additional gas treatment apparatuses can be provided upstream or downstream from the separation apparatus 148.

Optionally, the cover gas system 112 can be operated as an on-line system, in which the gas outlet stream 154 can be drawn from the head space 128 while the reactor 100 is in use. In this configuration, the gas outlet stream 154 may be extracted at a generally uniform flow rate while the reactor 100 is in use. Alternatively, the flow rate of the gas outlet stream 154 may vary over time and/or in response to operating conditions of the reactor. Operating the cover gas system 112 in an on-line configuration may allow the $^3$He gas to continuously extracted from the head space 128 while the reactor 100 is in use. This may allow collection of $^3$He gas from active reactors and may help to minimize disruptions or alterations to the operating conditions of the reactor.

Alternatively, the cover gas system 112 can be operated in an off-line or batch-type system.

It is understood that only some aspects of the reactor 100 are illustrated in the present schematic. An operational reactor 100 incorporating one or more of the aspects of the present teaching may include any combination of suitable operating components, including, for example, control rods, light water condensate pumps, secondary cooling loops, fuel loading machines, a reactor containment building, a pressurizer, valves, pumps and any other suitable equipment.

While treatment of the moderator cover gas 114, via a moderator cover gas system 112 is described in detail above, an analogous process may be used to extract $^3$He from the coolant cover gas 137. A coolant cover gas system 1112 may include some or all of the elements of the cover gas systems described herein, and/or may include additional elements not described above. The coolant cover gas system 1112 may be generally similar to the moderator cover gas system 112, and analogous elements are illustrated using like reference numerals indexed by 1000. The coolant cover gas system 1112 may include any suitable $^3$He separation apparatus 1148 that may be in fluid communication with head space 1128 within the pressurizer 109 (or at any other suitable location or locations within the coolant system 113). A cover gas extraction passage 1140 may transport the coolant cover gas 1128, including $^3$He mixed therein, for processing, and treated cover gas may be returned to the head space 1128 via the gas supply passage 1138.

Figure 2:
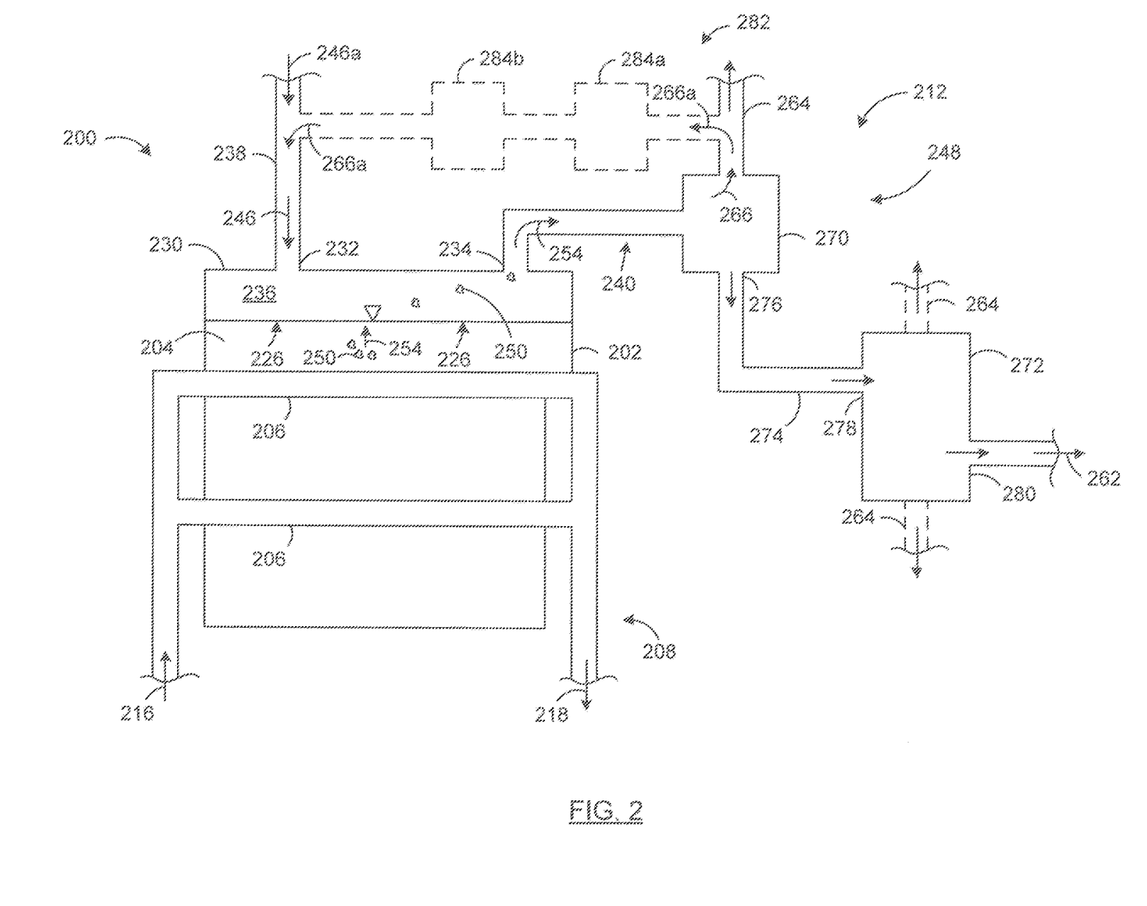
FIG. 2 is a schematic representation of another example of heavy water nuclear reactor.

Referring to FIG. 2, another schematic example of a reactor 200 includes a calandria 202 and pressure tubes 206. The reactor 200 may be generally similar to reactor 100, and like elements are illustrated using like reference characters indexed by 100.

The calandria 202 contains a heavy water moderator liquid 204 and a cover gas head space 228 is provided above the free surface 226 of the moderator liquid 204. A cover gas supply passage 238 is connected to gas inlet 232 to introduce the cover gas 236 into the head space 228, and a gas extraction passage 240 extends away from the gas outlet 234 to extract a gas outlet stream 254 from the head space 228.

A $^3$He separation apparatus 248 is provided in the gas extraction passage, downstream from the gas outlet. In the illustrated example, the $^3$He separation apparatus 248 is a two-stage apparatus that includes a first separation module 270 and a second separation module 272 provided downstream from the first module 270. The first and second separation modules 270, 272 may be the same apparatus/process, or alternatively may be different apparatuses/processes. An intermediate conduit 274 extends from an outlet 276 on the first separation module 270 to an inlet 278 on the second module 272. A $^3$He gas outlet 280 on the second module 272 can form the $^3$He gas outlet for outputting a $^3$He gas stream 262.

At least one, or both, of the first separation module 270 and second separation module 272 may also include one or more second outlet 264 for outputting a treated cover gas stream 266, or other gas output stream. Optionally, in the illustrated example, as illustrated using dashed lines, at least a portion 266a of the treated cover gas 266 stream may be recycled via a recycle passage 282 and re-introduced in the cover gas supply passage 238, upstream from the cover gas inlet 232 of the calandria 202.

Optionally, one or more suitable treatment apparatuses may be provided in the recycle passage. In the illustrated configuration, two gas treatment apparatuses 284a and 284b are provided in the recycle passage 282. The gas treatment apparatuses 284a and 284b may be preheaters, recombination units, filters, separators, flame arresters or any other suitable apparatus. Passing the treated cover gas stream 266a through one or more treatment apparatuses 284a and 284b may help remove additional impurities from the cover gas and otherwise treat the cover gas so that it is suitable for re-introduction into the head space 228. This may help make the treated cover gas 266a more suitable for re-use.

While illustrated as being provided in the recycle passage 282, the gas treatment apparatuses 284a and 284b may be provided in the gas extraction passage 240, and optionally, may be upstream from the $^3$He separation apparatus 248.

Alternatively, or in addition to receiving recycled cover gas 266a, the gas supply passage 238 may be connected to any suitable external cover gas source (not shown). The cover gas 236 supplied to the head space 228 may comprise recycled cover gas 266a, fresh cover gas 246a or any suitable combination thereof.

Figure 3:
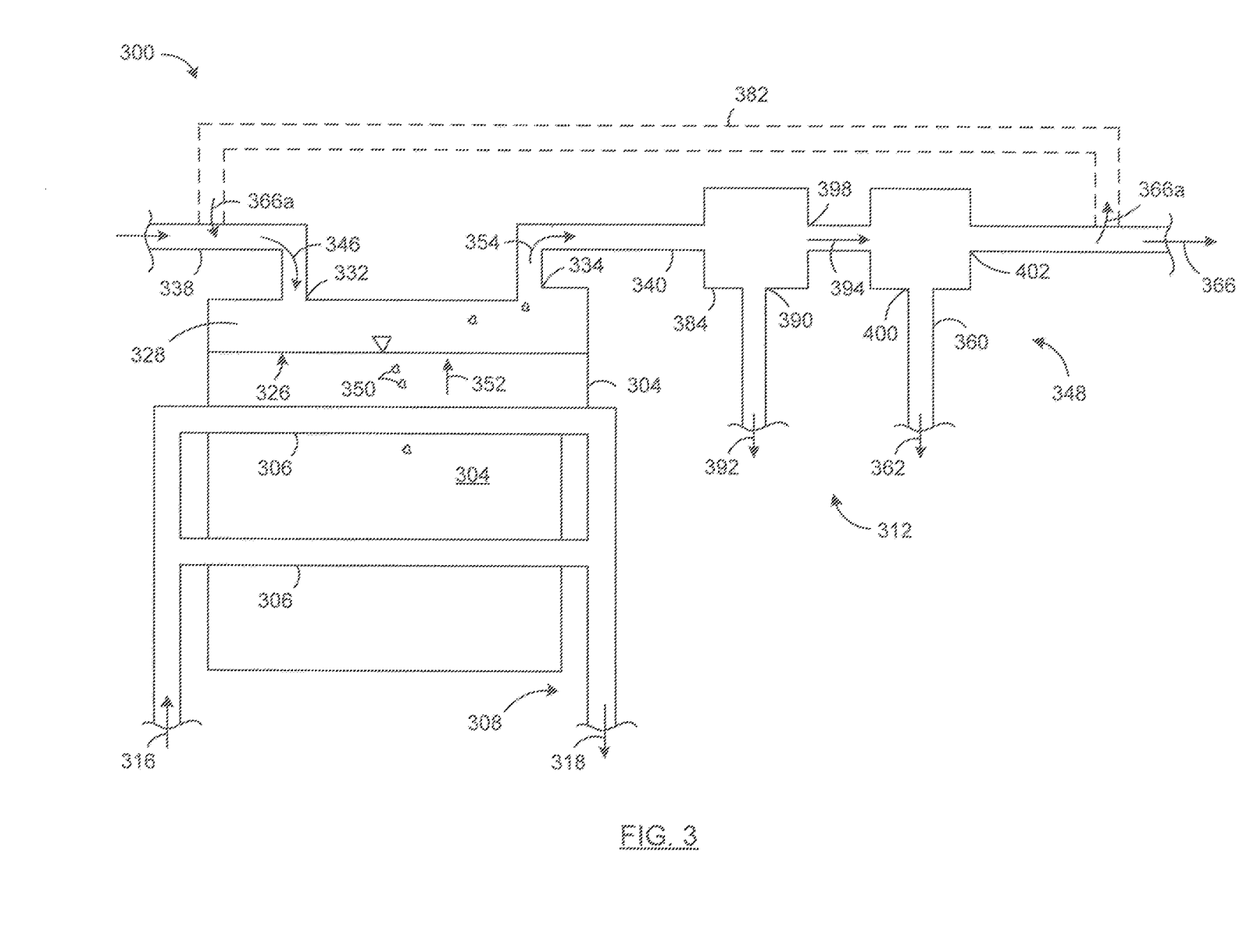
FIG. 3 is a schematic representation of another example of heavy water nuclear reactor.

Referring to FIG. 3, another schematic example of a reactor 300 includes a calandria 302, pressure tubes 306 and a cover gas supply passage 338. A heavy water moderator liquid 304 is contained in the calandria 302 and a cover gas head space 328 covers the free surface 326 of the moderator 304. The reactor 300 may be generally similar to reactor 100, and like elements are illustrated using like reference characters indexed by 200

In the illustrated example, a gas treatment apparatus 384 is provided the extracted gas passage 340 upstream from the $^3$He separation apparatus 348. The gas outlet stream 354 can be extracted from the head space 328 and fed into the gas treatment apparatus 384. Impurities and other gases removed by the gas treatment apparatus 384 can be discharged via a first outlet 390 as an impurity gas stream 392.

After treatment, a partially treated gas stream 394, for example comprising primarily $^3$He and $^4$He gases, can exit the gas treatment apparatus 384 via a second outlet 398 and can flow into the $^3$He separation apparatus 348. A stream of separated $^3$He gas 362 can exit the $^3$He separation apparatus 348 via a first outlet 400, and a stream of treated cover gas 366 can exit the $^3$He separation apparatus via a second outlet 402. In some configurations, based on the performance and characteristics of the gas treatment apparatus 384 and the $^3$He separation apparatus 348, the stream of cover gas 366 exiting the $^3$He separation apparatus 348 may be substantially pure $^4$He gas.

Positioning one or more gas treatment apparatuses 384 upstream from the $^3$He separation apparatus 348 may facilitate removal of impurities and other gases from the gas outlet stream 354 before the gas outlet stream reaches the $^3$He separation apparatus 348. This may help prevent fouling or damage to the $^3$He separation apparatus 348. This may also help improve the efficiency of the $^3$He separation apparatus 348 and/or allow for the use of a particular $^3$He separation apparatus (providing a given separation process) that may not be suitable for use on a gas stream that includes impurities or a mixture of gases other than $^3$He and $^4$He gases.

Optionally, a gas recycle passage 382 can be provided to recycle some or all of the cover gas 366 exiting the $^3$He separation apparatus 348 to the cover gas supply passage 338 for re-introduction into the head space 328.

In all the configurations shown in FIGS. 1, 2 and 3, the devices and equipment for separating out $^3$He can be provided in a separate circuit from the main circuit, possibly in parallel with it, to maintain a separate circulation of the helium to the cover gas space above the moderator, so that any failure of equipment in the separate circuit should not compromise operation of the main circuit. As noted it may be preferable, in the separate circuit to provide elements to remove or otherwise process other contaminant gases. For example some form of igniter can be provided to ensure that any hydrogen or deuterium present is burned to form water. After removal or processing of such contaminants, the helium isotopes can be separated.

Figure 4:
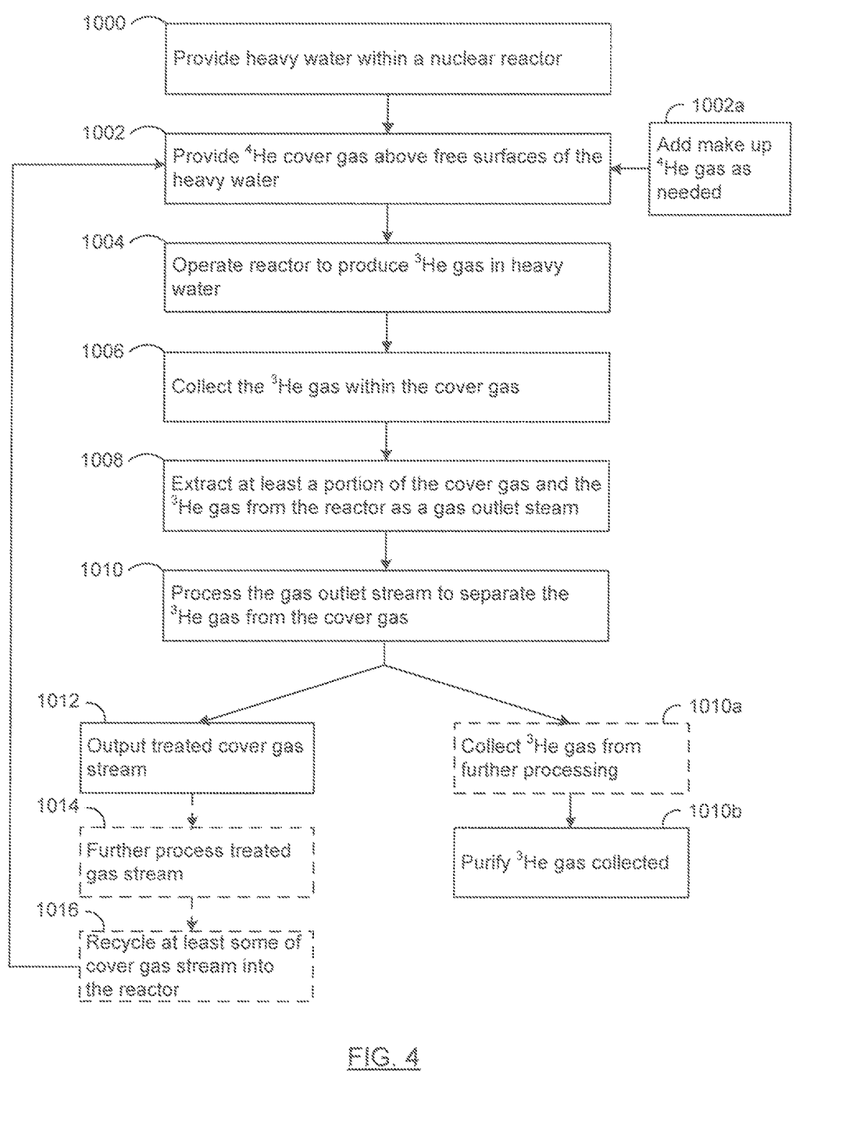
FIG. 4 is a flow chart illustrating an example of a method of collecting $^3$He gas.

Referring to FIG. 4, a method of collecting $^3$He from a pressurized heavy water nuclear reactor may begin a step 1000 with providing heavy water as either a moderator, coolant or both within a heavy water reactor. At step 1002 a cover gas can be provided within the reactor and may cover at least a portion of the free surface of the heavy water. Optionally, the cover gas may be substantially pure $^4$He, for example comprising at least 90% $^4$He by volume. If necessary, additional make-up cover gas may be added to the reactor from time to time, as needed, at step 1002a.

At step 1004 the heavy water nuclear reactor may be operated to produce $^3$He gas, for example via decay of tritium in the heavy water. At least a portion of the $^3$He gas may escape from the heavy water and mix with the cover gas, at step 1006.

At step 1008 an outlet gas stream is extracted from within the reactor. The outlet gas stream may include a mixture of the cover gas, the $^3$He gas and other trace gases and/or impurities.

At step 1010 the $^3$He gas is separated from the outlet gas stream using a suitable separation apparatus. Optionally, the method can include the optional step 1010a of collecting or routing the $^3$He gas for further processing, and the optional step 1010b in which the collected $^3$He gas can be further treated or purified.

At step 1012 a $^3$He gas stream may be output from the separation apparatus for further processing, and at step 1012 a treated cover gas stream may also be output from the separation apparatus.

Optionally, at step 1014 at least a portion treated cover gas stream can be further processed or treated using a suitable gas treatment apparatus.

At optional step 1016, at least a portion of the treated cover gas can be recycled by reintroducing at least a portion of the treated cover gas stream into the reactor.

Optionally, some or all of steps 1000 to 1016 can be on-line steps performed while the heavy water nuclear reactor is operating. Alternatively, some or all of steps 1000 to 1016 can be off-line steps performed while the reactor is not operating.

The step of separating the $^3$He gas from the outlet gas stream may include utilizing any suitable apparatus and/or carrying out any suitable process including, for example, at least one of a thermal diffusion process, a fractional diffusion process, a heat flush process, a superleak process and a differential absorption process.

While heavy water reactors including both a heavy water moderator and heavy water coolant are illustrated, the $^3$He extraction apparatuses and methods described herein may be used on any suitable heavy water reactor, including, for example, reactors having a heavy water moderator and a non-heavy water coolant, reactors having a non-heavy water moderator and a heavy water coolant and reactors having a non-heavy water moderator, a non-heavy water coolant but that include some other type of heavy water circuit or system that is provided within the reactor such that $^3$He is formed in the heavy water system.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A method of collecting $^3$He from a nuclear reactor, the method comprising:
   a. providing heavy water at least part of which is exposed to a neutron flux of the reactor;
   b. providing a cover gas in fluid communication with the heavy water;
   c. operating the nuclear reactor whereby thermal neutron activation of deuterium in the heavy water produces tritium ($^3$H) and at least some of the tritium produces $^3$He gas by β⁻decay and at least a portion of the $^3$He gas escapes from the heavy water and mixes with the cover gas;
   d. extracting an outlet gas stream, the outlet gas stream comprising a mixture of the cover gas and the $^3$He gas; and
   e. separating the $^3$He gas from the outlet gas stream using at least one of a thermal diffusion process, a fractional diffusion process, a heat flush process, a superleak process and a differential absorption process.

2. The method of claim 1, further comprising outputting a $^3$He gas stream for further processing.

3. The method of claim 2, further comprising treating the outlet gas stream to provide a treated cover gas stream.

4. The method of claim 3, further comprising mixing at least a portion of the treated cover gas stream into the cover gas in fluid communication with the heavy water.

5. The method of claim 1, wherein the step of extracting the outlet gas stream is performed while nuclear reactor is operating.

6. The method of claim 5, wherein the outlet gas stream is extracted as a generally continuous stream while nuclear reactor is operating.

7. The method of claim 1, wherein the step of separating the $^3$He gas from the outlet gas stream is an on-line process that is performed while the nuclear reactor is operating.

8. The method of claim 1, wherein when the cover gas contacts the heavy water at a free surface interface.

9. A method of collecting $^3$He from a nuclear reactor, the method comprising:
   a. providing heavy water at least part of which is exposed to a neutron flux of the reactor;
   b. operating the nuclear reactor whereby thermal neutron activation of deuterium in the heavy water produces tritium ($^3$H) and at least some of the tritium produces $^3$He gas by β⁻decay and at least a portion of the $^3$He gas escapes from the heavy water;
   c. extracting an outlet gas stream including the $^3$He gas; and
   d. separating the $^3$He gas from any other gas in the outlet gas stream using at least one of a thermal diffusion process, a fractional diffusion process, a heat flush process, a superleak process and a differential absorption process.

* * * * *